(12) United States Patent
Davis et al.

(10) Patent No.: US 8,990,324 B2
(45) Date of Patent: Mar. 24, 2015

(54) DISTRIBUTING MESSAGES IN MULTIPLE FORMATS IN TACTICAL COMMUNICATIONS NETWORKS

(75) Inventors: Joseph W. Davis, Union City, PA (US); Kwok N. Yau, New York, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 76 days.

(21) Appl. No.: 13/383,149

(22) PCT Filed: Apr. 20, 2011

(86) PCT No.: PCT/US2011/033204
§ 371 (c)(1),
(2), (4) Date: Feb. 1, 2012

(87) PCT Pub. No.: WO2011/133644
PCT Pub. Date: Oct. 27, 2011

(65) Prior Publication Data
US 2012/0136954 A1     May 31, 2012

Related U.S. Application Data

(60) Provisional application No. 61/326,935, filed on Apr. 22, 2010, provisional application No. 61/326,926, filed on Apr. 22, 2010.

(51) Int. Cl.
*G06F 15/16*     (2006.01)
*G06F 9/44*     (2006.01)
*H04L 29/08*     (2006.01)

(52) U.S. Cl.
CPC ............. *G06F 8/34* (2013.01); *H04L 67/2823* (2013.01); *H04L 67/12* (2013.01)

USPC ........... 709/206; 709/246; 709/248; 370/464; 370/466; 370/467

(58) Field of Classification Search
CPC ....... H04L 67/327; H04L 29/06; H04L 67/04; H04L 67/2823; H04L 69/08; H04L 69/329; H04L 12/2856; H04L 65/4076; H04L 65/4084; H04L 67/16; H04L 67/303; H04L 67/36; H04L 69/14; H04L 69/24
See application file for complete search history.

(56) References Cited

U.S. PATENT DOCUMENTS 5,574,904 A    11/1996   Yunoki et al.
5,666,553 A    9/1997   Crozier (Continued)

OTHER PUBLICATIONS

Synthesys Systems Engineers Ltd., Variable Message Format (VMF) Information Sheet.

(Continued)

*Primary Examiner* — Dustin Nguyen
*Assistant Examiner* — Thao Duong
(74) *Attorney, Agent, or Firm* — Leo Zucker; Daniel J. Long (57) ABSTRACT

A method of translating a source message having a first set of defined word fields in a source message format, into a sink message having a second set of defined word fields in a desired sink message format. A common message format (CMF) is defined to have a third set of word fields that corresponds to a union of the first and the second sets of word fields. For any given word field in the third set of word fields in the CMF, information contained in a corresponding word field in the source message, if any, is mapped to the given word field in the CMF. For any given word field in the second set of word fields in the sink message format, information contained in a corresponding word field of the CMF, if any, is mapped to the given word field in the sink message.

12 Claims, 12 Drawing Sheets

(56) References Cited

U.S. PATENT DOCUMENTS

| | | | |
|---|---|---|---|
| 6,154,748 A | 11/2000 | Gupta et al. | |
| 6,278,697 B1* | 8/2001 | Brody et al. | 370/310 |
| 6,785,730 B1* | 8/2004 | Taylor | 709/230 |
| 6,973,516 B1 | 12/2005 | Athannas et al. | |
| 7,490,112 B1 | 2/2009 | Suresh et al. | |
| 7,617,328 B2 | 11/2009 | Lewis et al. | |
| 2002/0161907 A1* | 10/2002 | Moon | 709/230 |
| 2003/0021395 A1* | 1/2003 | Oden et al. | 379/88.14 |
| 2003/0101283 A1* | 5/2003 | Lewis et al. | 709/246 |
| 2004/0008723 A1* | 1/2004 | Uchida et al. | 370/466 |
| 2005/0005022 A1 | 1/2005 | Taylor | |
| 2006/0031586 A1* | 2/2006 | Sethi et al. | 709/246 |
| 2007/0088850 A1 | 4/2007 | Alperin et al. | |
| 2008/0043759 A1 | 2/2008 | Poetker et al. | |
| 2009/0066509 A1 | 3/2009 | Jernstrom et al. | |
| 2009/0144324 A1* | 6/2009 | Sturdy | 707/104.1 |
| 2010/0142700 A1 | 6/2010 | Lee et al. | |
| 2011/0055338 A1* | 3/2011 | Loeb et al. | 709/206 |
| 2011/0103393 A1* | 5/2011 | Meier et al. | 370/401 |

OTHER PUBLICATIONS

M. Hura et al., Interoperability—A continuing Challenge in Coalition Air Operations, Chap. 9—Tactical Data Links, RAND Corp., # MR-1235 (2000).

* cited by examiner

MMT COMMON SYSTEMS VS. MESSAGE TYPES MATRIX

| COMMON SYSTEMS | MESSAGE STANDARDS | | | |
| --- | --- | --- | --- | --- |
| | CURSOR ON TARGET (CoT) | VARIABLE MESSAGE FORMAT (VMF) | J-MESSAGES | SAINT |
| LAND WARRIOR | | X | | |
| FBCB2 | | X | | |
| RAPTORX | X | | | |
| SAINT | | | | X |
| ADSI | | | X | |
| REMOTE MMT'S | X | X | X | X |

FIG. 10

MMT COMMON SYSTEMS VS. TRANSPORT TYPES MATRIX

| COMMON SYSTEMS | TRANSPORT TYPES | | | | | |
| --- | --- | --- | --- | --- | --- | --- |
| | UDP | TCP | MULTICAST UDP | PNN XMPP | FILE |
| LAND WARRIOR | | | X | | X |
| FBCB2 | | | X | | X |
| RAPTORX | X | | | | X |
| SAINT | | | | X | X |
| ADSI | X | X | X | | X |
| REMOTE MMT'S | X | X | | | X |

DISTRIBUTING MESSAGES IN MULTIPLE FORMATS IN TACTICAL COMMUNICATIONS NETWORKS

CROSS REFERENCE TO RELATED APPLICATIONS

This application claims priority under 35 U.S.C. Sec. 119 (e) of U.S. Provisional Patent Application No. 61/326,926 filed Apr. 22, 2010, and titled "Method and Apparatus to Provide a Situational Awareness Integrated Network Technologies (SAINT) System"; and No. 61/326,935 also filed Apr. 22, 2010, and titled "Method and Apparatus for a Mult-Message Translator (MMT)". The mentioned '926 and '935 applications are incorporated herein by reference in their entireties.

BACKGROUND OF THE INVENTION

1. Field of the Invention

The present invention relates to communications networks, and particularly to communications between networks and nodes that use different message formats.

2. Discussion of the Known Art

Presently, communications among networks or nodes that use different message formats are facilitated by so-called message translators in a "one to one" manner. That is, such translators operate only by translating or converting the format of an entire message originating from a given source, to the format associated with the designated recipient. Thus, each time a message is to be distributed to nodes associated with a new format, the translator must be reconfigured to output the entire message in the new format for distribution to such nodes.

U.S. Pat. No. 5,666,553 (Sep. 9, 1997) describes a method of mapping, translating, and reconciling data (e.g., two appointments scheduled at the same time) across two disparate computer applications or platforms such as a handheld computer and a desktop computer. Data stored in each of the platforms is translated to a common format based on user-specified mapping of data fields identifying the handheld and the desktop fields to be translated. If a specific data item (e.g., an appointment) already exists on the desktop platform, the user is given an opportunity to replace the existing data, or to ignore or modify the incoming data. See also, U.S. Pat. Appl'n Pub. 2009/0066509 (Mar. 12, 2009) disclosing a method of translating separate bar code and RFID data signals from a mobile device by parsing the signals to match a record layout of a common data format, reformatting the matched data from the signals into the common format, and passing the latter to an application in the device or an external network.

U.S. Pat. Appl'n Pub. 2007/0088850 (Apr. 19, 2007) discloses a communications architecture for providing cross-platform support for a variety of media types. Content provided by one or more servers from one or more media types (e.g., voicemail or call feature) is translated to one or more common language messages, each being one of a number of message types representing a different user-facing service provided by the server. The common language messages may comprise calls to an application program interface (API), or extensible mark-up language (XML) files, according to the publication. See also U.S. Pat. No. 7,617,328 (Nov. 10, 2009).

Specifically in tactical environments, a large number of existing military and commercial networks do not all share an identical message format. It therefore becomes very challenging to exchange messages and other data between the nodes of such networks. For example, message protocols such as Cursor On Target (CoT) and Variable Message Format (VMF) are commonly used but represent two distinct, incompatible message formats. They do incorporate similar data such as. Situation Awareness (SA) information, e.g., GPS current location, however. A need therefore exists for an improved, low cost system and process wherein messages that are structured according to different formats but contain, for example, important SA and other tactical information can be accurately translated and distributed to recipients in need of such information notwithstanding the communications devices used by the recipients at any given time.

SUMMARY OF THE INVENTION

According to the invention, a method of translating a source message having a first set of word fields defined according to a source message format, into a sink message having a second set of word fields defined according to a desired sink message format, includes defining a common message format (CMF) having a third set of word fields that corresponds to a union of the first and the second sets of word fields. For any given word field in the CMF, information contained in a corresponding word field in the source message format, if any, is mapped to the given word field in the CMF. Further, for any given word field in the sink message format, information contained in a corresponding word field in the CMF, if any, is mapped to the given word field in the sink message format.

For a better understanding of the invention, reference is made to the following description taken in conjunction with the accompanying drawing and the appended claims.

DETAILED DESCRIPTION OF THE INVENTION

A tactical gateway product suite developed by BAE Systems and known as Situational Awareness Integrated Network Technologies or "SAINT", extends the common operating picture (COP) to the tactical edge by distributing geospatially relevant information among various participants on a given mission. SAINT leverages commercial technology and networks to provide a warfighter with on-demand location based services. Its capabilities include wireless communications using commercial off the shelf (COTS) fixed/mobile base stations, IEEE 802.11 wireless access and GFE tactical radios; geo-referenced blue force tracking, targeting, and imaging (still and video); and gateway functionality among commercial networks including MOTOTRBO, Garmin radios, SOF, and Army networks such as Land Warrior, Raptor X (SOF GIS), PRC-117G, SINCGARS, and FBCB2. The geo-referenced information may be imported from outside sources such as Land Warrior, shared by a community of local users, and exported to outside consumers of interest such as FBCB2 or CPOP.

The SAINT suite includes an application package that operates on COTS handheld hardware including smart phones, cell phones, rugged PDA's, and UMPCs that can be easily carried by soldiers on the ground and which use commercial cellular and/or IEEE 802.11 access protocols. SAINT also allows voice interoperability between mobile phones and tactical PTT radios (e.g., ATT Tilt to PRC-117G), as well as message or data interoperability across heterogeneous networks (e.g., JVMF to CoT).

Figure 1:
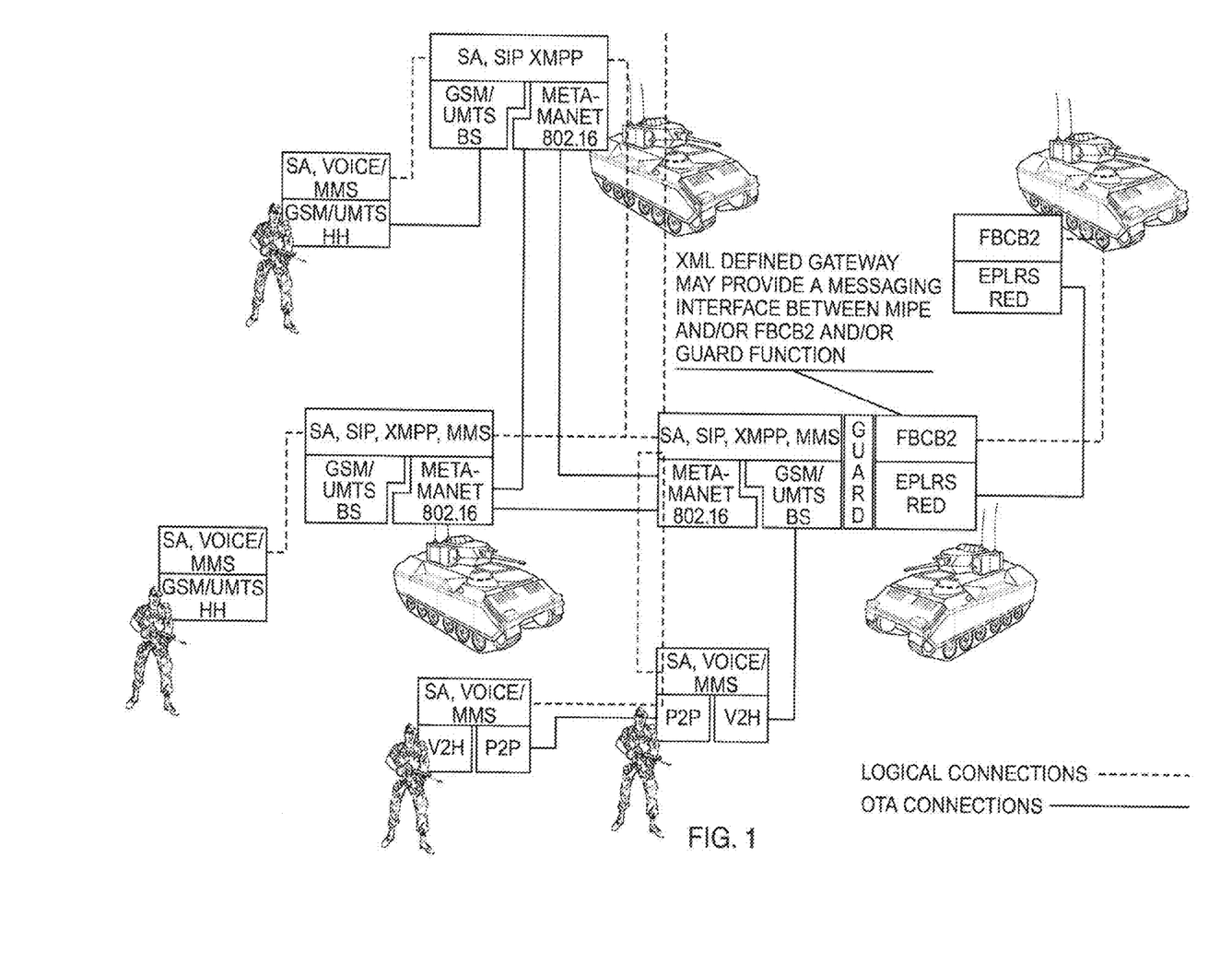
FIG. 1 is a pictorial representation of a tactical communications system wherein situational awareness (SA) information from multiple sources is distributed to soldiers equipped with conventional wireless telephone devices.

FIG. 1 illustrates the use of SAINT to provide secure location based services at low cost to tactical users, including individual dismounted soldiers carrying COTS cellular telephone or other standard handheld wireless communication devices. SAINT offers self protection by informing each warfighter of where are my buddies and where are the hostiles, providing a secure geo-referenced tactical map with points of interest (POIs) and other imagery, allowing push to talk communications over cellular networks with tactical radios such as SINCGARS, and providing interoperablity with various databases and Command and Control (C2) applications (e.g., Land Warrior and FBCB2).

The geo-referenced map may feature "thumb friendly" pop-up menus that allow the user to (a) add, modify, or attach comments or media files to POIs, (b) find, follow, and connect quickly to buddies, (c) access geo-referenced information such as pictures, and (d) obtain bearing and distance information to POIs. Buddy lists can provide status information and a quick interface for finding and collaborating with other users. SAINT also allows for group or individual text chat with visual indications to confirm delivery.

As mentioned, in addition to providing bridging functionality among non-compatible voice communication systems, the SAINT suite creates a tactical message gateway for interoperability with legacy situational awareness (SA) and command and control systems. The message gateway, referred to herein as a Multi-Message Translator or "MMT", is the subject of the present patent application and is described in further detail below.

Basically, the inventive MMT enables SA/C2 message interoperability, routing, and filtering among systems that employ disparate military and commercial messaging, transport, and networking protocols. The MMT supports both event and polling-based message distribution, and has a modular architecture that allows new message formats and profiles to be quickly incorporated. In one preferred embodiment, the inventive translator uses Extensible Markup Language (XML) to define routing and filtering rules so that any existing routing or filtering semantics can be preserved in the MMT system. Every message transaction may be logged in a common message format that can be accessed by an embedded or enterprise database, and the translator can support centralized or distributed deployments. Open-standard format support may include, for example, TDL-J/Link 16, JREAP C, Variable Message Format (VMF), Cursor-on-Target (CoT), US SOCOM SA/C2, XMPP, UDP, TCP, IPv4, IPv6, and Multicast. The inventive translator can also be configured to support multiple proprietary message formats for specific customer communities, and implemented on a variety of COTS and GOTS server hardware systems using, e.g., Java.

The MMT is configured to convert the format of each incoming message or data originating from a given source into an intermediate common message format (CMF), wherein each data or word field of the incoming message is mapped into a corresponding word field of the CMF. Data or information mapped into a given field in the CMF is then mapped into a corresponding field of an outgoing (or "sink") message format recognized by each desired destination network or node. The incoming messages may also be regarded as connectors into external programs that originate the messages or data sets, and the sink messages as connectors into external programs designated to receive the incoming messages or data. The MMT can therefore also operate to distribute messages even when an incoming message and the desired recipient(s) use the same message format.

Examples of data sources include, but are not limited to:
1. Laser Range Finder
2. Radio Host Controllers (for messages generated by the rest of the network)
3. Simulated Message Generators (Trackserver, etc.)
4. ADSI
5. Saint—Personal Network Node (PNN)

Examples of data sinks include, inter alia;
1. SA Displays (World Wind, Google Maps, Raptor X, etc.)
2. Radio Host Controllers (for messages that need to be pushed to the rest of the network)
3. ADSI
4. DBMS
5. PNN According to the invention, the intermediate common message format (CMF) embodied in the MMT is structured with enough data or word fields so that any given field in the CMF corresponds to a word field in the format of any given source or sink message to be processed by the MMT. That is, the word fields of the CMF are a union of all the word fields in the various message formats the MMT is desired accommodate. Preferably, all the data contained in a source message is mapped via the CMF into corresponding word fields in the sink message format, and none of the source message data is initially discarded. If the sink message format has one or more word fields for which no corresponding source message data has been mapped to the CMF, then the MMT may, for example, enter a "0" or other null word in such sink message fields.

Figure 2:
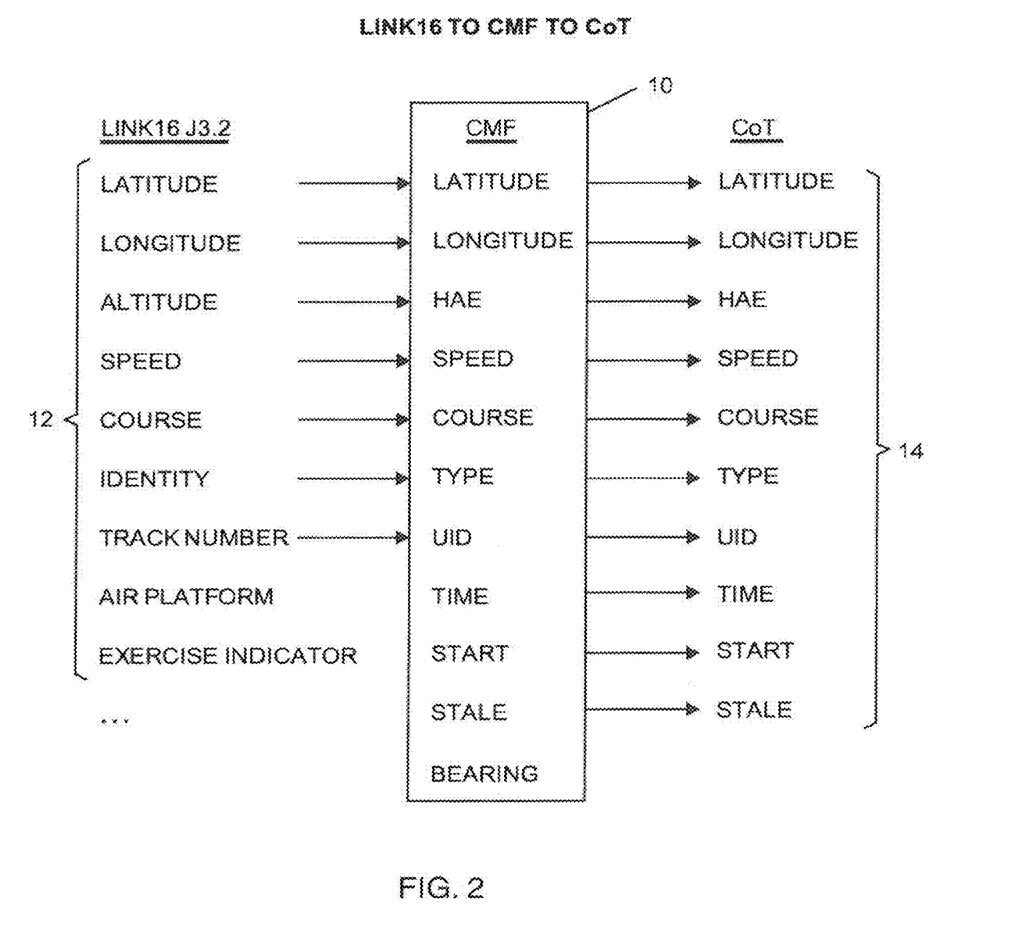
FIG. 2 depicts a translation of a message in a Link 16 format into a corresponding message in a CoT format according to the invention.

FIG. 2 illustrates the operation of the inventive MMT 10 when translating a Link 16 type J3.2 source message 12 into a CoT formatted sink message 14. Note that each of the data word fields of the intermediate CMF corresponds to word field in either the Link 16 or the CoT format.

Figure 3:
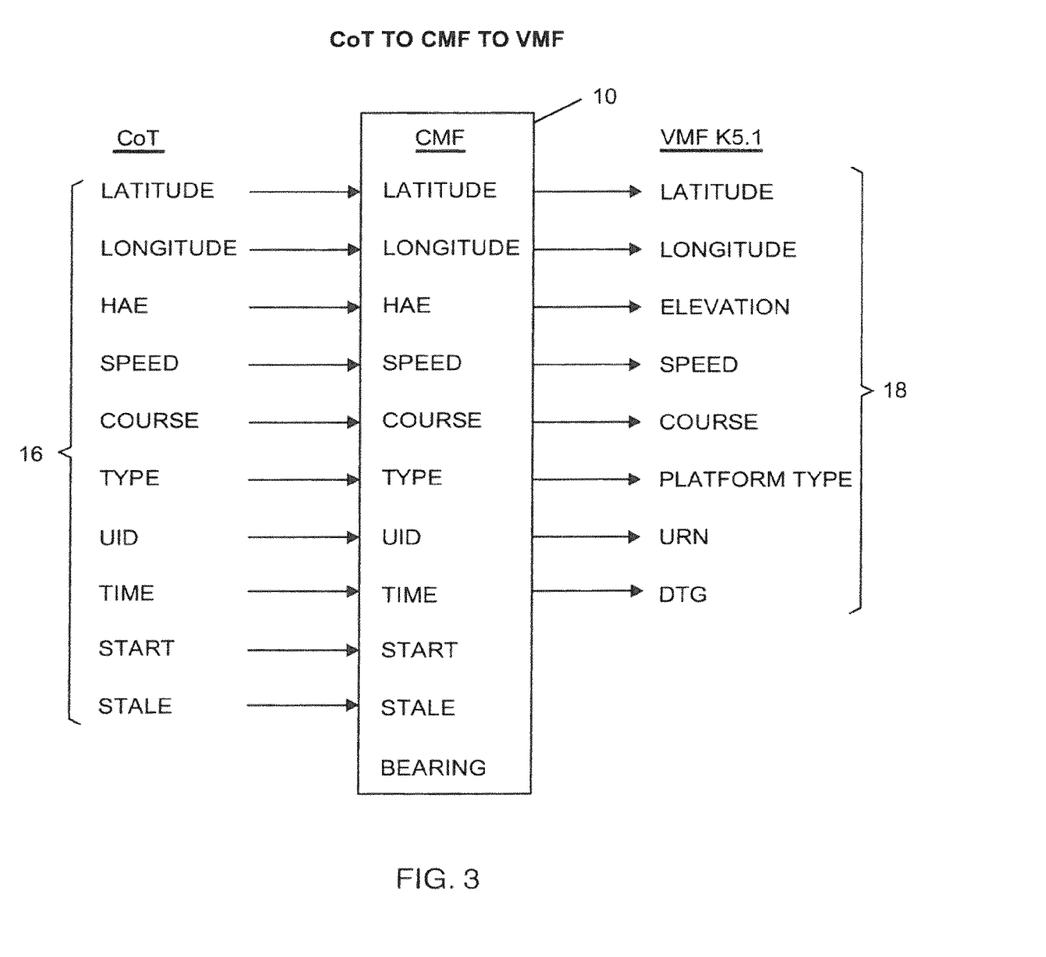
FIG. 3 depicts a translation of a message in a CoT format into a corresponding message in a VMF format according to the invention.

FIG. 3 illustrates the operation of the MMT 10 when translating a CoT source message 16 into a VMF type K5.1 sink message 18. Note again that each of the word fields of the intermediate CMF matches a word field of either the CoT or the VMF format.

Message sources and sinks may be created dynamically during runtime using, for example, an open Java GUI. As detailed below, a GUI may be configured to display a window that shows a real-time animated view of the sources, the sinks, and the messages flowing between them. If the MMT application is written as a Java program, then the server, computer or other hardware platform on which the MMT is run may require the installation of an available Java Runtime Environment (JRE) application and related known programs or files (e.g., "jar" library files) as would be apparent to a skilled programmer.

Figure 4:
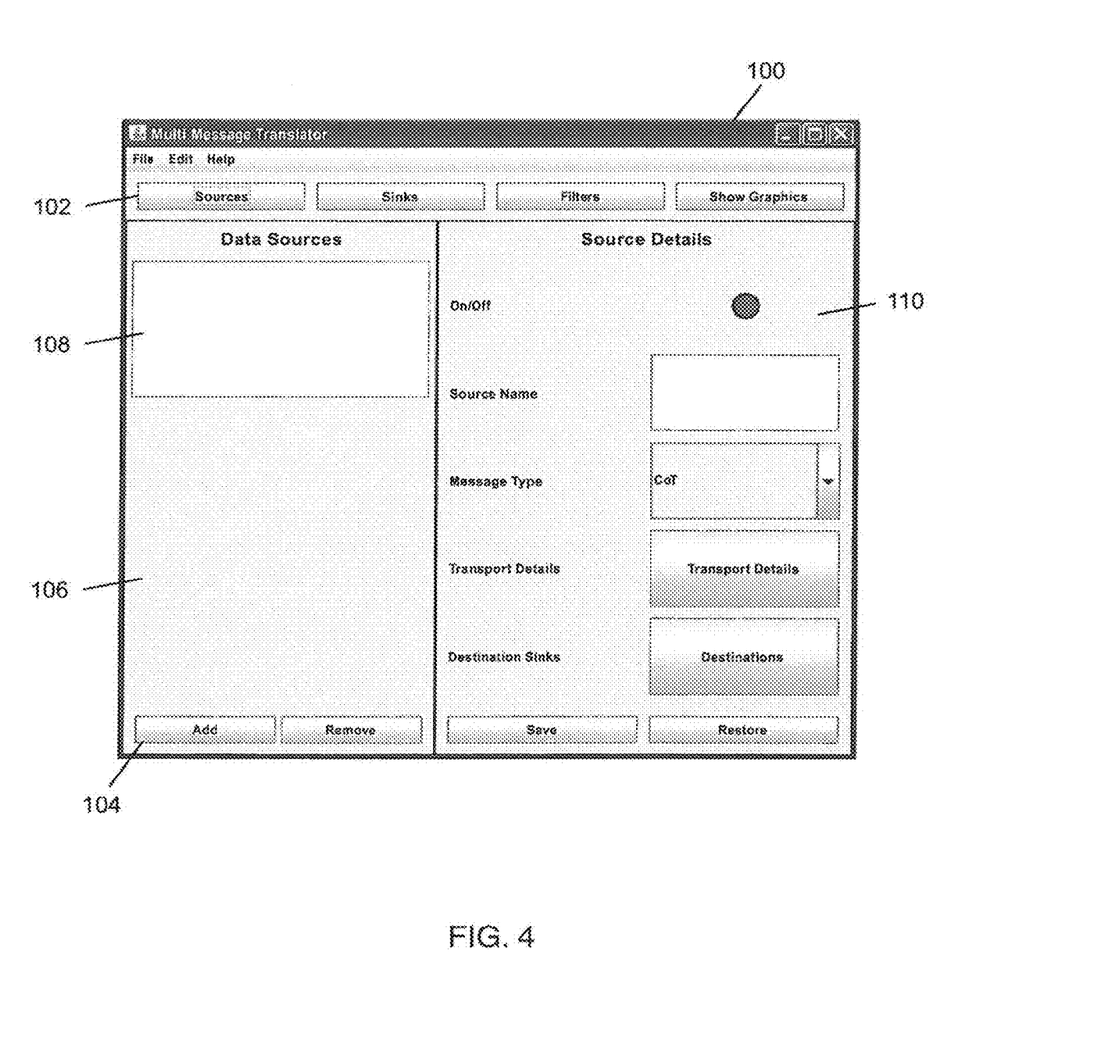
FIGS. 4 to 7 are window screens of a graphical user interface (GUI) that may be used when translating and/or distributing messages according to the invention.
Figure 5:
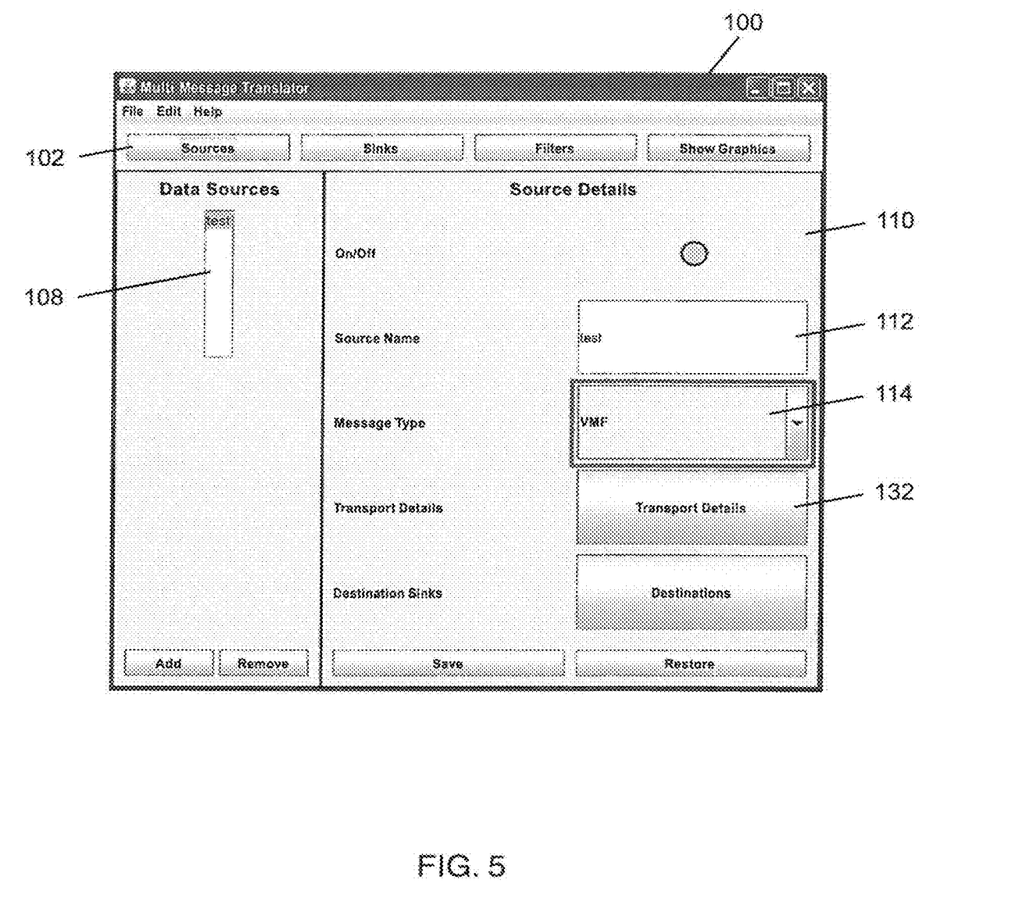

Setting Up Data Sources (FIGS. 4 and 5)

FIGS. 4 and 5 show an example of a main window 100 that may be displayed by a server or other hardware platform implementing the MMT. The user clicks on a Sources button 102 at the top left of the window 100, and then clicks an Add button 104 at the bottom of a Data Sources pane 106. Available data sources appear within a Data Sources field 108 inside the pane 106. Preferably, all the listed sources have already been configured on the system, and "clicking" on a listed source will display certain values corresponding to the source in a Source Details pane 110 at the right of the window 100.

As seen in FIG. 5, when the user selects a data source (e.g., "test"), the source name is displayed inside a Source Name field 112 in the Source Details pane 110. The message type or format used by the source (e.g., VMF) is then highlighted on a drop-down menu that appears inside a Message Type field 114. Message formats may include, for example:
- CoT (Cursor On Target)
- L16 (Link 16; J-Series Messages)
- VMF (Variable Message Format; K-Series Messages)
- MNUGS (Mesh Node Unattended Ground Sensor)
- PNN (Personal Networking Node)

Figure 6:
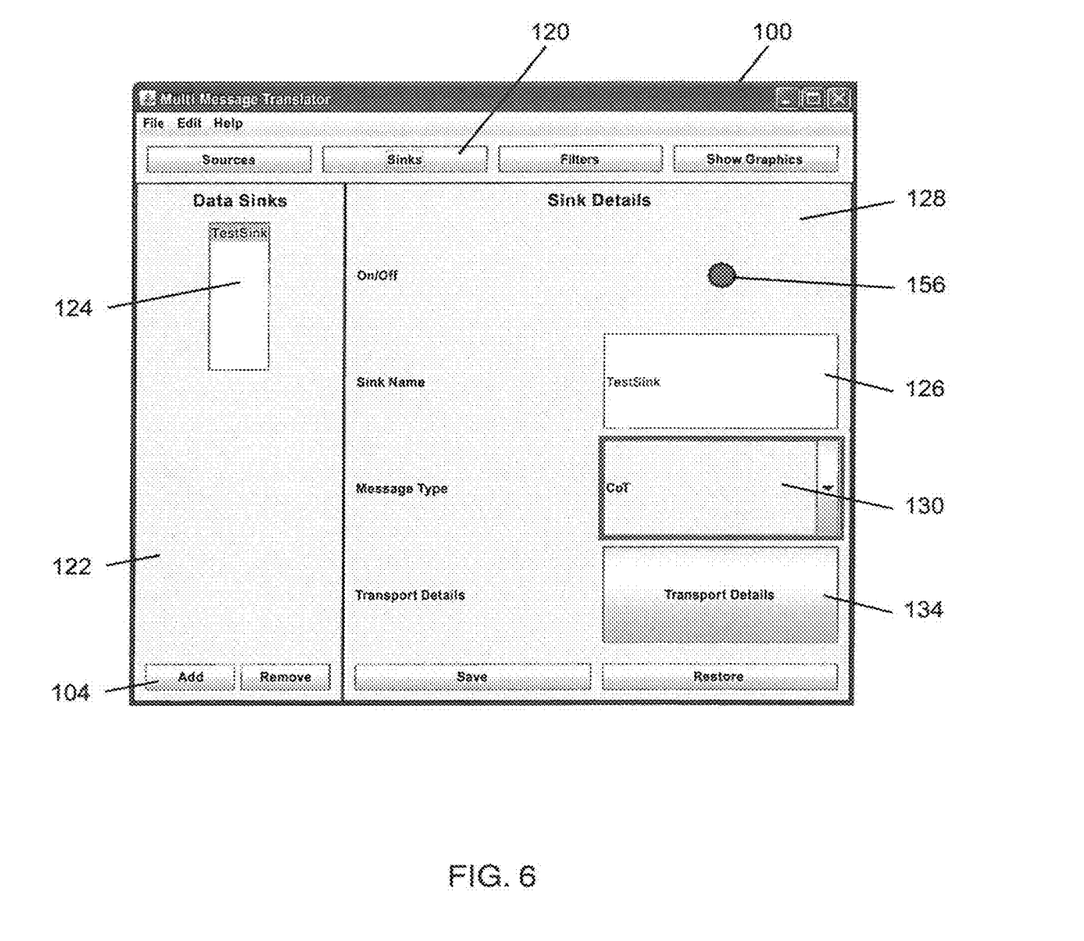
Figure 7:
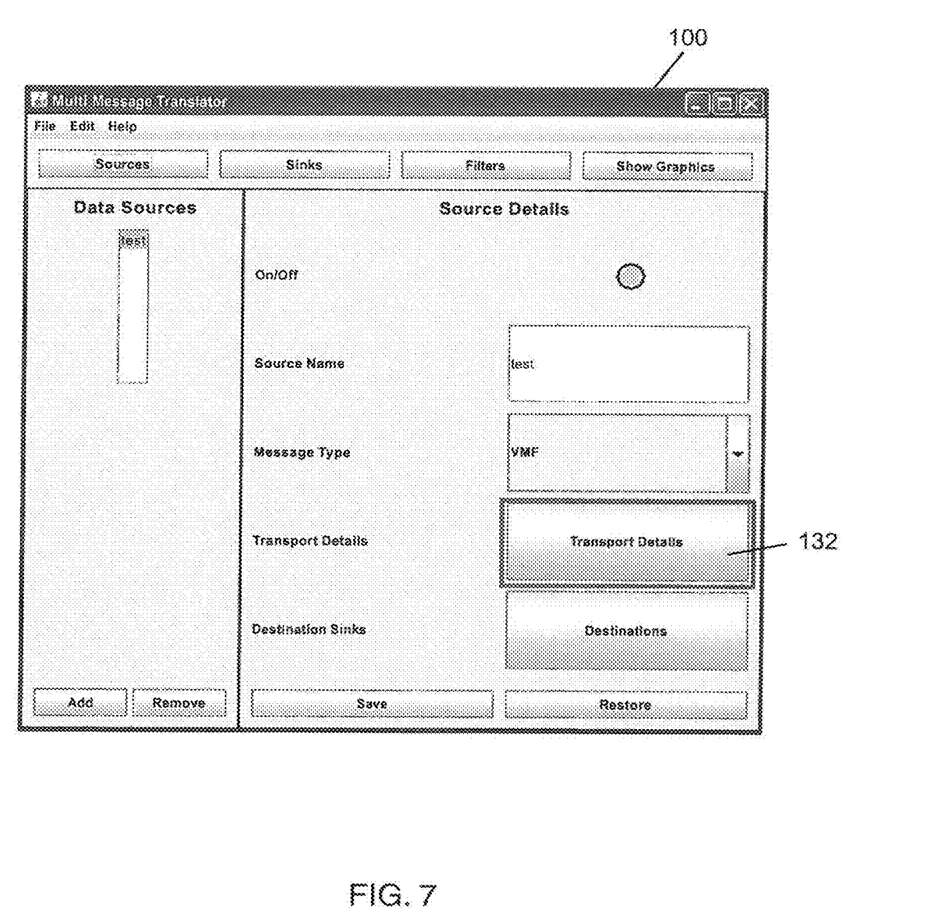

Setting Up Data Sinks (FIG. 6)

To set up a data sink, the user clicks a Sinks button 120 at the top of the screen 100, and then clicks the Add button 104 at the bottom of a Data Sinks pane 122 displayed at the left of the screen 100 in FIG. 6. Available data sinks are listed inside a Data Sinks field 124 in the pane 122, and a desired sink is selected by the user from the displayed list. The selected sink name (e.g., TestSink) is displayed inside a Sink Name field 126 within a Sink Details pane 128 at the right of the screen 100 in FIG. 6.

The message type or format used by the data sink (e.g., CoT) is selected from a drop-down menu in a Message Type field 130 in the pane 128. Preferably, the Data Sinks field 124 lists all sinks that have already been configured on the system, and clicking on a given sink causes the values associated with the sink to be displayed in the Sink Details pane 128.

Message formats used by data sinks may include, for example:
- CoT (Cursor On Target)
- L16 (Link 16; J-Series Messages)
- VMF (Variable Message Format; K-Series Messages)
- PNN (Personal Networking Node)

After selecting a source and a sink, the user proceeds to set up a transport.

Setting Up Transports (FIGS. 6 to 9)

Figure 8:
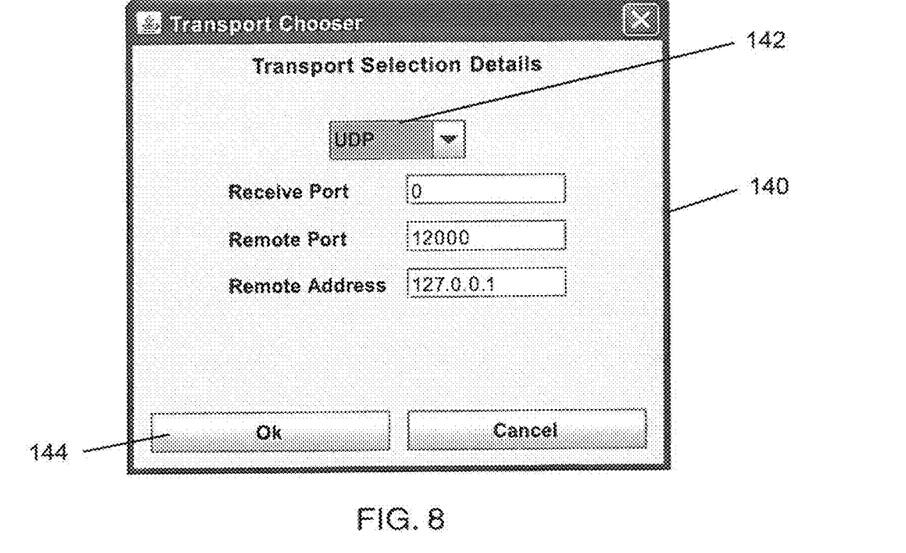
FIGS. 8 and 9 are window panels of the GUI that may be used to choose transports for source and for sink messages according to the invention.
Figure 9:
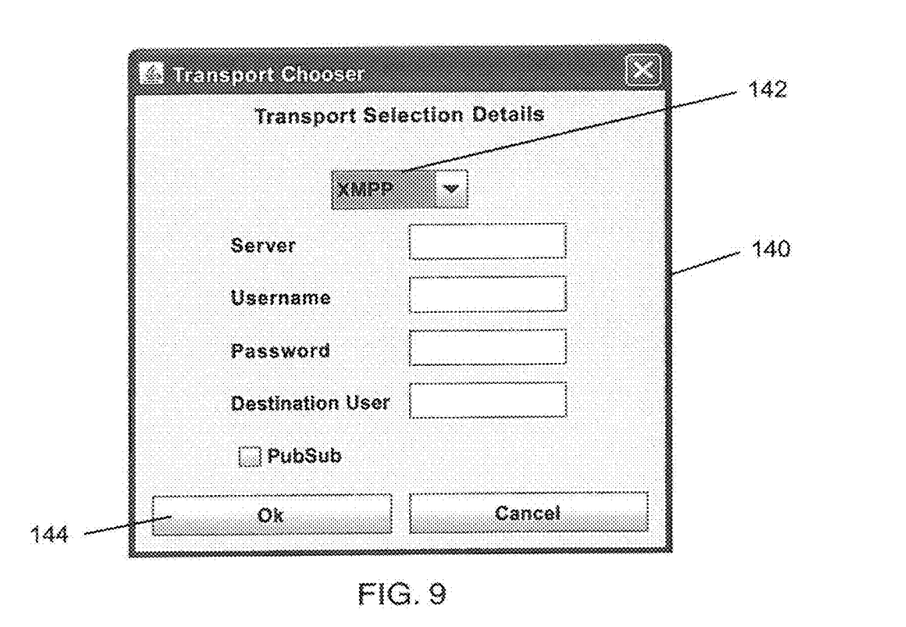
Figure 10:
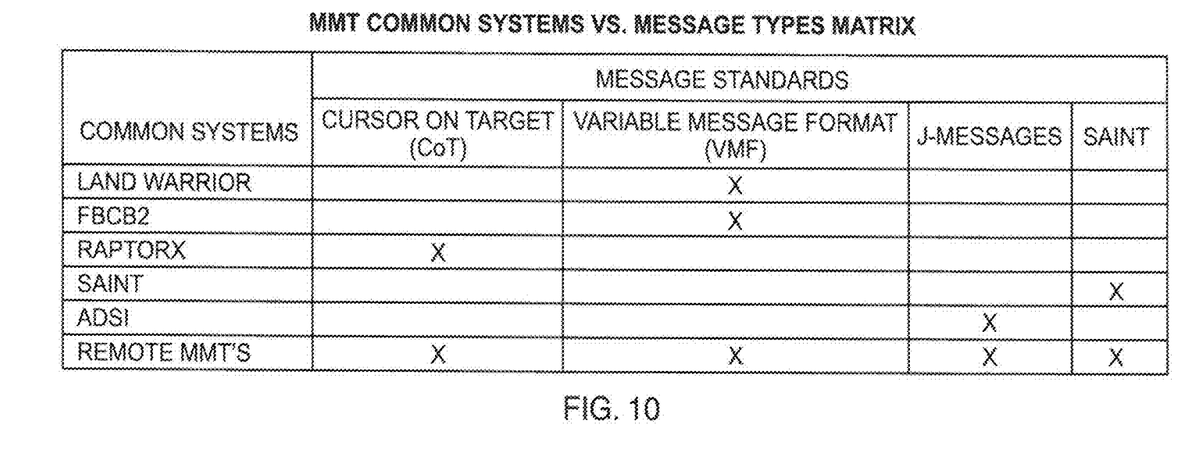
FIG. 10 is a table identifying message standards or formats for certain tactical communications networks.
Figure 11:
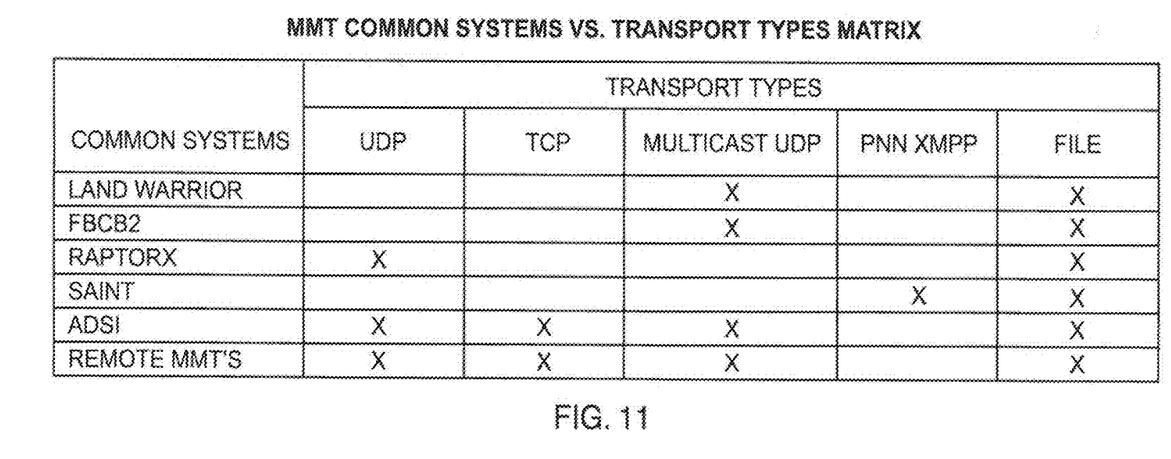
FIG. 11 is a table identifying transports used for the networks in the table of FIG. 10.

The transport corresponds to the transmission standard to be used for communicating source messages to the MMT 10, and the standard to be used for sending the translated messages from the MMT to the message sinks. Such transmission standards may include, for example:
- UDP
- TCP
- Multicast UDP
- Serial
- XMPP To set up a transport for a source or a sink, the user clicks inside either a Transport Details field 132 displayed in the Source Details pane 110 (FIGS. 5 and 7), or a Transport Details field 134 displayed in the Sink Details pane 128 (FIG. 6), as the case may be. A Transport Chooser panel 140 such as shown in FIGS. 8 and 9 is displayed. The type of transport desired (e.g., UDP in FIG. 8 or XMPP in FIG. 9) is selected from a drop down list 142, and corresponding values are entered depending on the selected transport. After the transport values are entered in the panel 140, the user clicks an OK button 144 and the selected transport is saved in association with the source or the sink currently being edited. FIG. 10 is a table that shows typical message formats or standards used by common tactical communications systems, and FIG. 11 is a table showing the types of transports typically used by the systems.

Figure 12:
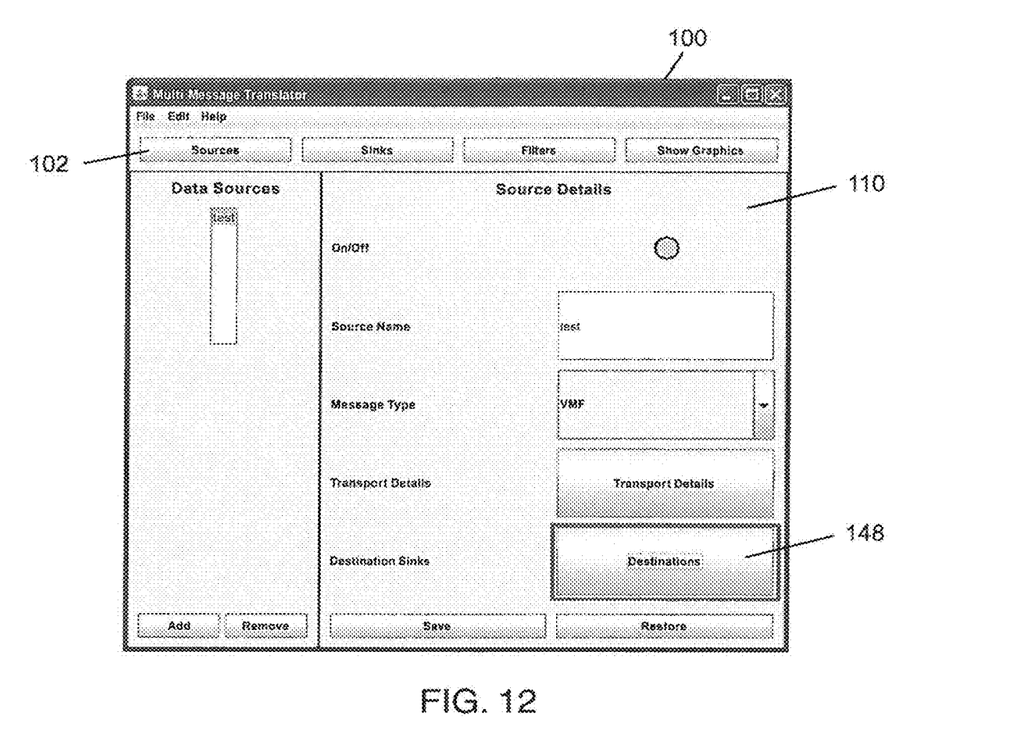
FIGS. 12 and 13 are GUI screens that may be used to connect a selected source to one or more desired sinks after choosing the corresponding transports.
Figure 13:
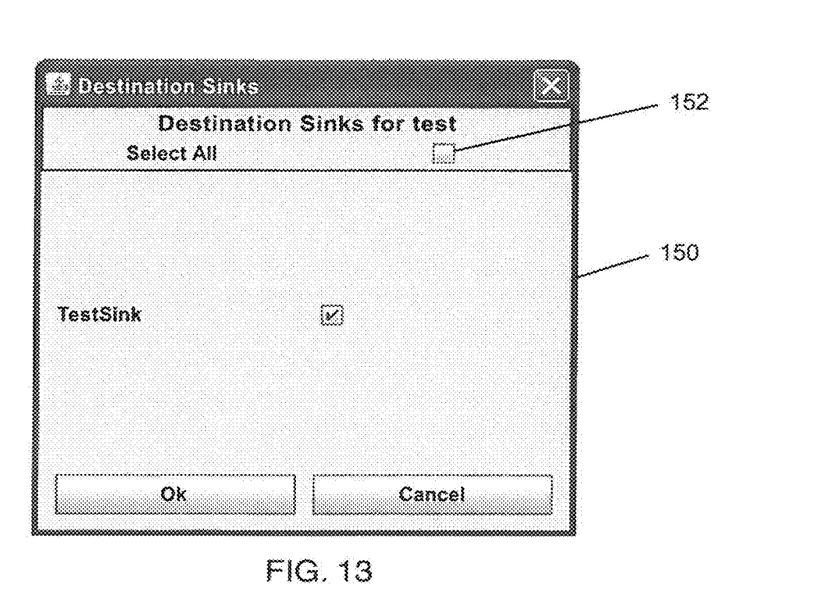

Connecting a Source to a Sink (FIGS. 12 and 13)

Once the user defines the sources, the desired sinks, and their associated transports, each source is logically connected to a desired sink(s). The user returns to the main screen 100, clicks the Sources button 102, and then clicks a Destinations button 148 in the Source Details pane 110 in FIG. 12. A Destination Sinks window 150 is now displayed as in FIG. 13.

The name of each sink currently entered in the MMT 10 is listed in the Destination Sinks window 150, with a corresponding checkbox. The user checks the box or boxes corresponding to one or more sinks to which the currently selected source is to be connected. A "Select All" option 152 may be provided to connect the current source to all of the saved sinks.

Figure 14:
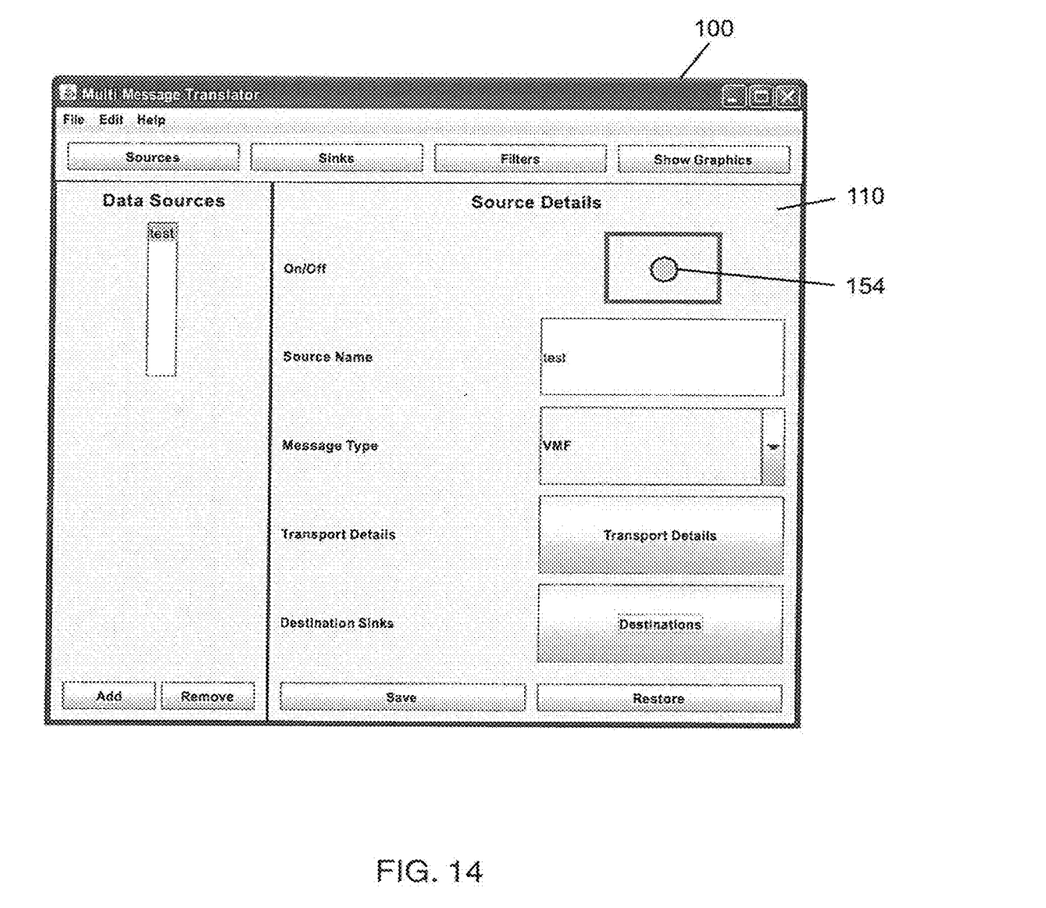
FIG. 14 is a GUI screen that may be used for activating or deactivating a selected source or sink.

Activating or Deactivating a Source or a Sink (FIG. 14)

Once saved in the MMT 10, the message sources and sinks may not be actively connected to the MMT. Accordingly, for example, a red or a green colored circle 154 may be displayed inside the Source Details pane 110, and a like circle 156 displayed inside the Sink Details pane 128 in FIG. 6, to show whether or not a selected source or sink is currently active. Clicking on the circle may then cause the selected entity to toggle between an active and an inactive state with respect to the MMT.

Figure 15:
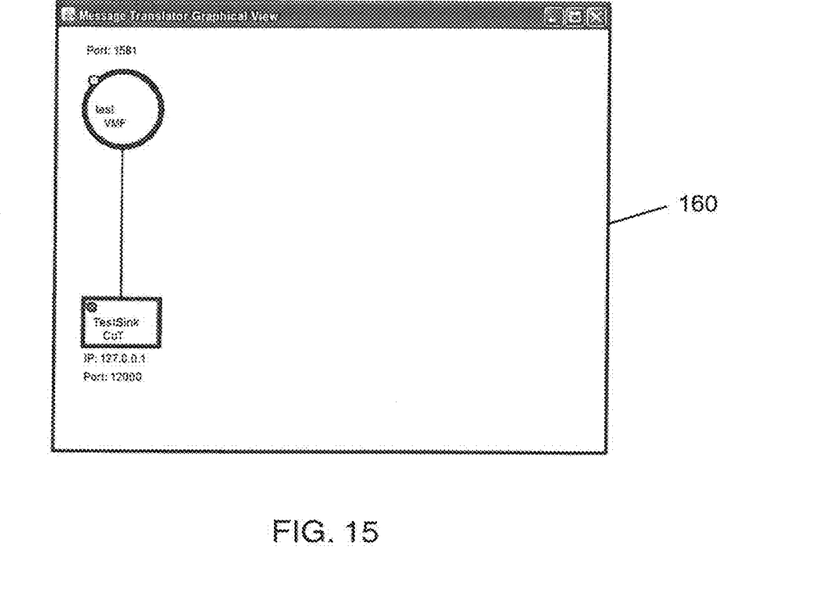
FIGS. 15 and 16 are GUI screens that may be used to illustrate a connection and a flow of messages from a selected source to one or more selected sinks according to the invention.
Figure 16:
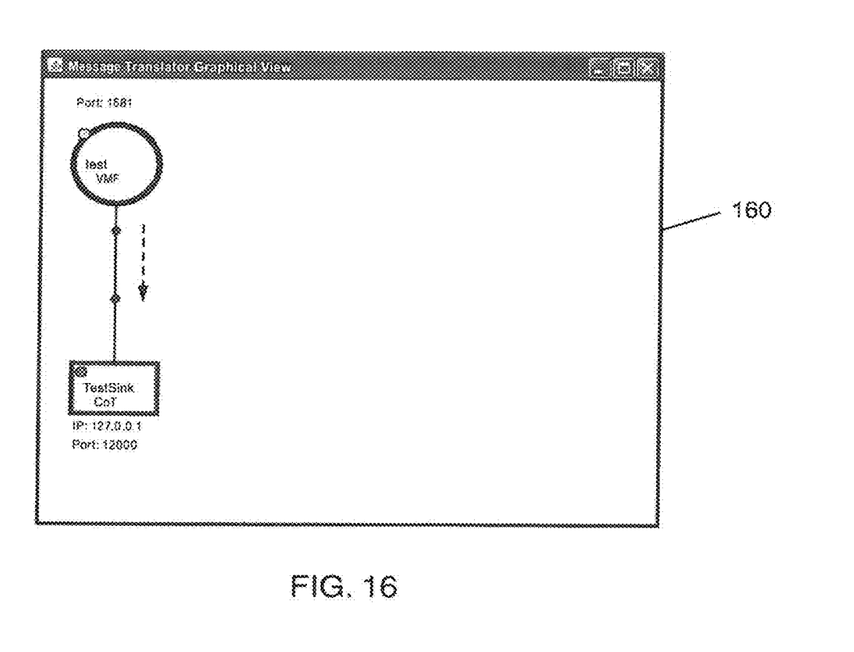

MMT Operational Graphic View (FIGS. 15 and 16)

Upon clicking a "Show Graphics" button at the top of the main screen 100, a screen 160 may be displayed as shown in FIGS. 15 and 16. For example, a blue circle at the top of the screen 160 may serve as an icon for a source, and a red rectangle at the bottom of the screen be an icon for a sink. The name of the source or the sink and its associated message format can be displayed inside the corresponding icon. A small green or red circle may also be displayed on or next to the icons to indicate if the source or sink is currently activated.

Transport specific information may be displayed, e.g., above each source icon and below each sink icon, and a line drawn between a source and a sink to show that the two entities are connected. i.e., that the source will pass any message it generates to the connected sink(s). When a source passes a message to a sink, a small colored dot may appear to move downwardly along the line connecting the source to the sink. See FIG. 16.

After creating a scenario by linking a source to one or more sinks, the scenario may be saved by clicking, e.g. a File->Save Scenario option provided via the main screen 100. From the File menu, the scenario may be saved with, e.g., a ".mmt" extension. To load a previously saved scenario, the user may click, e.g., a File->Load Scenario option via the main screen 100, and the previously saved file selected from the File menu. All sources and sinks previously saved as active are preferably maintained as active when loaded.

EXAMPLE

Set Up of Source and Sink for Land Warrior

For example, to configure the MMT 10 to connect with the Land Warrior system, several sources and sinks need to be set up. A configuration file may also be needed to map VMF URN's to UID's used elsewhere in the system. The following steps accomplish these requirements.

In Land Warrior, messages are typically sent and received on multiple multicast groups. For each group, one source and one sink need to be set up.

First, to set up the URN/UID map configuration file:
1. Open or create the file "URNMap.xml" in an MMT install directory.
2. For each Incoming URN from Land Warrior, add an entry into the tracks element, following the pattern:
   <Track UID="CDR-TRK-1BN121N" URN="507039"/>.
3. The URN corresponds to a Unique Reference Number assigned to each Land Warrior track, and the UID corresponds to a Unique Identifier used by other systems such as a CoT system or the Saint Suite.
4. The user adds an entry for each track that will be pushing into the Land Warrior system. The format is the same.

A Land Warrior system administrator may need to be contacted to negotiate which URNs are being used and which are available.

To set up Land Warrior sources in the MMT 10:
1. Add a new source using the add button 104 in the Data Sources pane 106 of the main screen 100.
2. Give the new source a name.
3. Set the message type to "VMF".
4. Click the Transport Details field 132.
5. Select "Multicast" via the Transport Chooser window 140.
6. Enter the multicast port and address.
7. Click the "Ok" button 144 to exit Transport Chooser.
8. Repeat 1-7 for each multicast group to be received.

To set up Land Warrior sinks in the MMT 10:
1. Add a new sink using the add button 104 in the Data Sinks pane 122 of the main screen 100.
2. Give the new sink a name.
3. Set the message type to "VMF".
4. Click the "Transport Details" field 134.
5. Select "Multicast" from the Transport Chooser window 140.
6. Enter the multicast port and address.
7. Click the Ok button 144 to exit Transport Chooser.
8. Repeat 1-7 for each multicast group to which messages are to be distributed.

MMT Filters

The inventive MMT 10 is capable of filtering messages based on several different factors. An MMT'filter may be configured and used to prevent messages not matching the filter parameters from progressing through the system. That is, a message not matching a filter applied to a given source will be dropped before the message is sent to sinks connected to the source. Configured filters can be applied to either sources or sinks. Applying a filter at a source implies that all messages will be filtered before being sent to the destination sinks connected to the source. Applying a filter at a sink implies that all messages coming from all sources connected to the sink will be filtered prior to the sink receiving the messages in its native format.

Filter Types

The following types of filters may be configured:

Radius Filter: Only allows messages with coordinates that are within a specified radius (in meters) of a specified point (in latitude/longitude) to pass.

UID Filter: Only allows messages with UIDs specified in the filter to pass. This is essentially a white list.

Type Filter Only allows messages with a type matching the type specified by the filter to pass. For example, the message type is placed in a "type" field of the Cursor-on-Target (CoT) message format.

Category Filter: Only allows messages with a category matching the category specified by the filter to pass. For example, values mapped to "categories" are 0 for Situational Awareness tracks, and 1 for Text Messages.

Configuring Filters

Filters may be configured by a skilled programmer using, for example, an XML file that is created upon saving a scenario. For example, XML tags that define the different filters may be as follows (variable values are in bold):

UID Filter Example

```
<Filter name="Uid">
    <FilterDetails>
        <Uid value ="Test"/>
        <Uid value ="Test2"/>
        <Uid value = "BillyBob"/>
    <FilterDetails>
    <SubFilters>
        <AndFilters/>
        <OrFilters/>
    </SubFilters>
</Filter>
```

Type Filter Example

```
<Filter name="Type">
    <FilterDetails>
        <Type value ="a-f-G"/>
        <Type value ='a-h-G"/>
        <Type value = "a-f-A"/>
    </FilterDetails>
    <SubFilters>
        <And Filters/>
        <OrFilters/>
    </SubFilters>
</Filter>
```

Category Filter Example

```
<Filter name="Category">
    <FilterDetails>
        <Category value ="0"/>
        <Category value ="1"/>
        <Category value = "N">
    </FilterDetails>
    <SubFilters>
        <And Filters/>
        <OrFilters/>
    </SubFilters>
</Filter>
```

Radius Filter Example

```
<Filter name="Radius">
    <FilterDetails latitude="40.12345" longitude="-74.6789"
    radius="100.5"/> <SubFilters>
        <AndFilters/>
        <OrFilters/>
    </SubFilters>
</Filter>
```

Running the MMT with Filters

Running the MMT 10 with filters may be performed once the filter is configured in the scenario (e.g., XML) file. The fitters preferably load simply upon running the application, and each filter may be displayed in the Graphic View 160 of the system as, e.g., a colored orange box placed on or near the icon of the message source or sink to which the filter is applied. See FIGS. 15 and 16.

The MMT method and system disclosed herein provide an efficient and low cost tool for distributing messages originating in one format, to various networks and receivers configured to detect and decode messages structured in a different format. Tactical situational awareness messages and information from various sources can be distributed, routed, and filtered appropriately. Individual dismounted soldiers can use commercial off-the-shelf cell phones, PDAs, or other common wireless devices to send and receive messages across heretofore incompatible communications platforms.

While the foregoing represents preferred embodiments of the invention, it will be understood by those skilled in the art that various changes and modifications may be made without departing from the spirit and scope of the invention. For example, it will be apparent that the inventive MMT 10 is capable of distributing messages originating in a given format to other networks or nodes configured to receive messages in the same format, with or without the various filters described above. Moreover, a database may be provided or operatively associated with the MMT for identifying or compiling messages that are routed through the translator. Accordingly, the invention includes all such changes and modifications as are within the scope of the following claims.

The invention claimed is:

1. A method of enabling message interoperability among systems that employ disparate military and commercial messaging, transport, and networking protocols, comprising:

providing a server or other programmable platform, including a graphical user interface (GUI);

defining, by the server or other programmable platform, a common message format (CMF) having a sufficient number of word fields so that any given word field in the CMF corresponds to a word field in a format associated with a message source or a message sink to be connected to the server or platform;

programing and configuring the GUI to display windows or panes for allowing a user of the GUI to (i) select a source for originating a source message, (ii) connect the selected source to the server, (iii) select a sink to which a sink message corresponding to the source message is to be sent by the user, and (iv) connect the selected sink to the server;

configuring the windows or panes displayed by the GUI to enable the user to select a message format to be associated with the selected source;

configuring the windows or panes displayed by the GUI to enable the user to select a message format to be associated with the selected sink;

mapping a word or data contained in a given word field of the source message in the associated source message format into a determined word field in the CMF;

mapping the word or data contained in the determined word field in the CMF into a corresponding word field of the sink message in the associated sink message format;

configuring the windows or panes displayed by the GUI to enable the user to set up a first transport corresponding to a first transmission standard for the source message from the selected source to the server or platform;

configuring the windows or panes displayed by the GUI to enable the user to set up a second transport corresponding to a second transmission standard for communicating the sink message from the server or platform to the selected sink; and applying, by the user, a filter for one or both of a given source and a given sink as desired, whereby;

applying a filter for the given source operates to filter all messages originating from the source before the server or platform sends corresponding filtered sink messages to destination sinks; and applying a filter for the given sink operates to filter all messages originating from all sources before the sink receives corresponding filtered sink messages from the server or platform.

2. The method of claim 1, including configuring the filter as a radius filter for passing only messages with coordinates that are within a specified radius of a defined geographical point.

3. The method of claim 1, including configuring the filter as a unique identifier (UID) filter for passing only messages having a specified unique identifier.

4. The method of claim 1, including configuring the filter as a type filter for passing only messages of a specified type.

5. The method of claim 1, including configuring the filter as a category filter for passing only messages that match a specified category.

6. The method of claim 1, including identifying or compiling incoming source messages in an associated database in the common message format (CMF).

7. The method of claim 1, including providing the source message in a Link 16 format, and providing the sink message in a Cursor on Target (CoT) format.

8. The method of claim 1, including providing the source message in a CoT format, and providing the sink message in a Variable Message Format (VMF).

9. The method of claim 1, including providing an external program, and originating the source messages from the external program.

10. The method of claim 1, including providing an external program, and receiving the sink messages by the external program.

11. The method of claim 1, including using the same format for the source and the sink messages.

12. The method of claim 1, including programming and configuring the GUI to display a real-time graphical representation of the selected source, the selected sink, and messages flowing from the source to the sink.

* * * * *